US009927247B2

(12) United States Patent
Ding et al.

(10) Patent No.: US 9,927,247 B2
(45) Date of Patent: Mar. 27, 2018

(54) INTEGRATING ONLINE NAVIGATION DATA WITH CACHED NAVIGATION DATA DURING ACTIVE NAVIGATION

(71) Applicant: GOOGLE INC., Mountain View, CA (US)

(72) Inventors: Yiyang Joy Ding, San Francisco, CA (US); Kevin Michael Grennan, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 40 days.

(21) Appl. No.: 14/741,944

(22) Filed: Jun. 17, 2015

(65) Prior Publication Data
US 2015/0369617 A1 Dec. 24, 2015

Related U.S. Application Data

(60) Provisional application No. 62/014,813, filed on Jun. 20, 2014.

(51) Int. Cl.
G01C 21/34 (2006.01)
G08G 1/0968 (2006.01)
(Continued)

(52) U.S. Cl.
CPC ......... *G01C 21/34* (2013.01); *G01C 21/3415* (2013.01); *G08G 1/096833* (2013.01); *H04W 8/183* (2013.01); *H04W 24/08* (2013.01)

(58) Field of Classification Search
CPC G01C 21/34; G01C 21/3415; G01C 21/3423; G08G 1/096833;
(Continued)

(56) References Cited

U.S. PATENT DOCUMENTS 5,522,041 A * 5/1996 Murakami ............... G06T 1/00
709/203
7,496,444 B1 * 2/2009 Fried .................. G01C 21/3679
340/988

(Continued)

FOREIGN PATENT DOCUMENTS

EP 2 051 223 A1 4/2009
WO WO-2005/057380 A2 6/2005
WO WO-2009/011839 A2 1/2009

OTHER PUBLICATIONS

GitHub, "Osmand," (2015). Retrieved from the Internet at: URL:https://github.com/osmandapp/Osmand.
(Continued)

Primary Examiner — Stephen Holwerda
(74) Attorney, Agent, or Firm — Marshall, Gerstein & Borun LLP

(57) ABSTRACT

When a portable device cannot connect to a network, offline navigation directions are generated and displayed by obtaining navigation instructions stored on the portable device which direct a user from a first location to a second location. When a network connection later becomes available, the portable device obtains online navigation directions from the first location to the second location from a navigation server. The portable device updates the offline navigation directions in a least disruptive manner, with information from the online navigation directions by determining the difference between the online and the offline navigation directions. If the online and offline navigation directions are similar, the portable device updates the display with estimated time data, traffic data, etc., from the online navigation directions. Otherwise, if there is a significant difference between the online and offline navigation directions, the portable device displays the online navigation directions as an alternative route.

18 Claims, 7 Drawing Sheets

(51) Int. Cl.
*H04W 8/18* (2009.01)
*H04W 24/08* (2009.01)

(58) Field of Classification Search
CPC ....... G08G 1/096866; G08G 1/096844; G08G 1/096811; H04W 8/183; H04W 24/08
See application file for complete search history.

(56) References Cited

U.S. PATENT DOCUMENTS

| | | | | |
|---|---|---|---|---|
| 8,620,319 | B1* | 12/2013 | Thandu | H04W 48/02 370/331 |
| 2002/0161519 | A1* | 10/2002 | Mori | G01C 21/3407 701/410 |
| 2006/0064241 | A1* | 3/2006 | Rasmussen | G01C 21/3641 701/400 |
| 2011/0010091 | A1* | 1/2011 | Currie | G01C 21/32 701/532 |
| 2011/0264366 | A1* | 10/2011 | Cabral | G01C 21/3415 701/533 |
| 2012/0084001 | A1 | 4/2012 | Suzuki | |
| 2012/0143504 | A1* | 6/2012 | Kalai | G01C 21/32 701/533 |

OTHER PUBLICATIONS

Google Play, "CoPilot GPS—Navigation App," (2015). Retrieved from the Internet at: URL:https://play.google.com/store/apps/details?id=com.alk.copilot.mapviewer.

Google Play, "GPS Navigation & Maps—Scout," (2015). URL:https://play.google.com/store/apps/details?id=com.skobbler.forevermapng&hl=en.

Google, "Mobile Maps," (2015). Retrieved from the Internet at: URL:https://www.google.com/maps/about/.

Extended European Search Report for Application No. 15172674.2, dated Aug. 24, 2015.

International Search Report and Written Opinion for Application No. PCT/US2015/035775, dated Aug. 24, 2015.

* cited by examiner

INTEGRATING ONLINE NAVIGATION DATA WITH CACHED NAVIGATION DATA DURING ACTIVE NAVIGATION

CROSS-REFERENCE TO RELATED APPLICATIONS

This application claims priority to provisional U.S. Application Ser. No. 62/014,813, filed Jun. 20, 2014, entitled "Integrating Online Navigation Data with Cached Navigation Data During Active Navigation," the entire disclosure of which is hereby expressly incorporated by reference herein.

FIELD OF THE DISCLOSURE

The present disclosure relates to digital mapping data and, more particularly, to merging online navigation data with offline navigation data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, embedded devices, etc., generate step-by-step navigation directions which may include traffic data. Typically, a user specifies the first location and the second location, and a software application displays the directions immediately and/or as the user travels from the first location to the second location. In some cases, the software applications also produce voice announcements corresponding to the navigation directions.

SUMMARY

A digital navigation module operates in a user device to obtain directions from a navigation server when a network connection of acceptable quality is available, and generates the directions locally using offline map data at other times. In a typical case, the navigation server may store more up-to-date direction information than the user device by using real-time traffic data, road and closure data, weather data, etc.

When the navigation module initially generates the directions locally and then receives updated directions from the navigation server, the navigation module provides the update via a user interface, in a least disruptive manner. For example, the update is provided without re-routing the user. To this end, the navigation module generates offline navigation directions locally via offline map data. Subsequently, when online navigation directions are available from the navigation server, the navigation module calculates the difference between the locally generated (or "offline") navigation directions and the server-generated (or "online") navigation directions. The navigation module then compares the difference between the offline navigation directions and the online navigation directions to a certain threshold value. When the difference between the online navigation directions and the offline navigation directions is below the threshold value, the navigation module merges the online navigation directions with the offline navigation directions by updating the display of estimated time, traffic, etc. Otherwise, when the difference is at or above the threshold value, the navigation module provides the online navigation directions as a selectable alternative to the offline navigation directions.

In particular, an example embodiment of the techniques of the present disclosure is a non-transitory computer-readable memory coupled to one or more processors and storing thereon (i) offline map data and (ii) instructions that implement a navigation module. The navigation module executes on the one or more processors to generate offline navigation directions from a first location to a second location using the offline map data, display the offline navigation directions via a user interface, and subsequent to generating the offline navigation directions, receive online navigation directions from a navigation server via a communication network. The navigation module further executes on the one or more processors to determine a difference metric based at least in part on the offline navigation directions and the online navigation directions. In response to determining that the difference metric between the offline navigation directions and the online navigation directions is below a certain threshold, the navigation module executes on the one or more processors to update the display of the offline navigation directions based at least in part on the online navigation directions. In response to determining that the difference metric between the offline navigation directions and the online navigation directions is not below the threshold, the navigation module executes on the one or more processors to provide the online navigation directions via the user interface as an alternative to the offline navigation directions.

Another embodiment of these techniques is a method for integrating online navigation directions with offline navigation directions. The method includes generating offline navigation directions from a first location to a second location using offline map data, and displaying the offline navigation directions via a user interface. Subsequent to generating the offline navigation directions, the method includes receiving online navigation directions from a navigation server via a communication network, and determining a difference metric based at least in part on the offline navigation directions and the online navigation directions. In response to determining that the difference metric between the offline navigation directions and the online navigation directions is below a certain threshold, the method includes updating the display of the offline navigation directions based at least in part on the online navigation directions. Further, in response to determining that the difference metric is not below the threshold the method includes providing the online navigation directions via the user interface as an alternative to the offline navigation directions.

DETAILED DESCRIPTION

Overview

Figure 1:
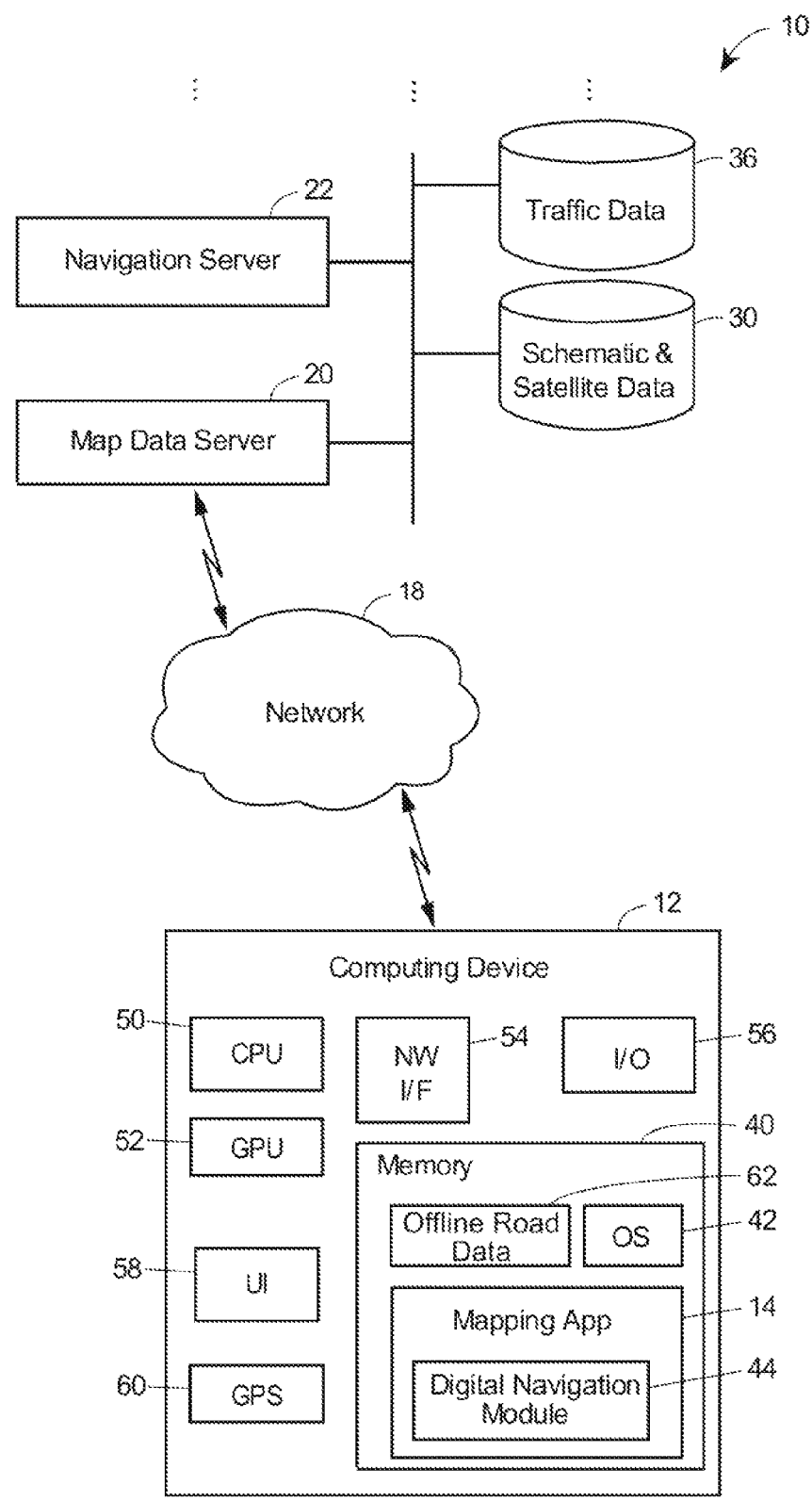
FIG. 1 illustrates a block diagram of an example communication system in which techniques for merging online with offline navigation directions can be implemented.

Generally speaking, techniques for integrating online navigation directions with an offline version can be implemented in a digital navigation module operating in a portable computing device, a non-portable computing device, one or several network servers, or a system that includes a combination of these devices. However, for clarity, the examples below focus primarily on an embodiment in which a user requests navigation directions on a portable computing device, and in response the portable computing device attempts to request the navigation directions from a navigation server. When the portable computing device cannot connect to a network, the network connection is of poor quality, or the navigation server is otherwise unavailable, the navigation directions are generated locally via offline map data stored at the portable computing device and displayed on a user interface. Later, when the portable device connects to the network, the navigation server provides additional sets of online navigation directions to the portable device.

Each set of online navigation directions is then compared to the offline navigation directions, to determine a difference metric. If a set of online navigation directions is determined to be similar to the offline navigation directions based on determining that the difference metric is below a threshold/target value/range, etc., then the offline navigation directions are updated on the user interface to reflect information from the online navigation directions. For example, the estimated time to the second location may be updated to reflect current traffic data from the navigation server. The current traffic data from the navigation also may also be displayed on the user interface, in addition to other navigation information from the server such as road closure data, weather data, etc.

If a set of online navigation directions is not sufficiently similar to the offline navigation directions based on determining that the difference metric is at or above a threshold/target/value/range, etc., the set of online navigation directions is displayed on the user interface as an alternative route. For example, if three sets of online navigation directions are significantly different from the offline navigation directions, then three alternative routes are provided via the user interface in addition to the offline navigation directions (e.g., in a scrollable list or in any other suitable manner).

In some embodiments, the offline navigation directions may be updated on the user interface to reflect information from the online navigation directions without a notification to the user depending on the difference metric. Moreover, in some scenarios based on the difference metric, the offline navigation directions may not be updated at all and/or the set of online directions may not be provided on the user interface as an alternative route. For example, there may be multiple thresholds/target values/ranges, etc. When the difference metric is below a first range, for example, the navigation module may do nothing and the offline navigation directions may not be updated at all. When the difference metric is within the first range, the navigation module may update the offline navigation directions with online navigation directions and provide a notification to the user that an update has occurred. When the difference metric is within the second range, the navigation module may update the offline navigation directions with online navigation directions without notification to the user. Further, when the difference metric is above the second range, the navigation module may display the online navigation directions as an alternative route.

In an exemplary scenario, John Doe is driving from Philadelphia to New York City. When he requests navigation directions, his computing device cannot successfully connect to a network. Instead, the computing device generates offline navigation directions via offline map data stored from past trips between Philadelphia and New York. However, John Doe may not have accurate traffic data or time estimate data for the route. As John Doe follows the offline navigation directions, the computing device identifies an available network to connect to and receives online navigation directions from the navigation server. If the difference metric between a set of online navigation directions and the offline directions is within a threshold/target value/range, etc., then the offline navigation directions are updated on the computing device to reflect information from the online navigation directions. For example, John Doe may be able to view traffic data and time estimate data for his route based on the update.

Example Hardware and Software Components

Referring to FIG. 1, an example system 10 in which the techniques outlined above can be implemented includes a portable device 12 (also referred to herein as a "computing device"), a map data server 20, and a navigation server 22. Depending on the implementation, the portable device 12 can be, for example, a smartphone, a tablet computer, a wearable computing device, a laptop computer, a desktop computer, a telematics unit, a portable navigation device, etc. The portable device 12 is coupled to the map data server 20 and the navigation server 22 via one or more connections in one or more communication networks 18, which can be any suitable local or wide area network (s) including a WiFi network, a Bluetooth network, a cellular network such as 3G, 4G, Long-Term Evolution (LTE), the Internet, etc. The portable device 12 also can communicate with additional content providers, servers, etc., via the communication network 18. In an example embodiment, the portable device 12 may be a smartphone connecting to a remote server such as the navigation server 22 over an LTE network.

The map data server 20 and navigation server 22 are coupled to a map database 30 which includes schematic and satellite data storing street and road information, topographic data, satellite imagery, etc. The servers 20, 22 are also coupled to a traffic database 36 which includes current traffic conditions, and also may include weather data, road closure data, estimated time data, etc. In general, the navigation server 22 can receive information related to geographic locations from any number of suitable databases, web services, etc. One or more operators can periodically update the databases 30 and 36 where each operator provides updates to the databases 30 and 36 at respective time intervals. For example, the traffic database 36 may store substantially real-time data, whereas the schematic and satellite database 30 may be updated relatively infrequently, such as once a week.

The schematic and satellite database 30 can store data in a raster format, a vector format, in any other suitable format or any combination thereof. In some implementations, the data is organized into map tiles at multiple zoom levels to facilitate serving map data to client devices. Depending on the implementation, the navigation server 22 can provide map and directions data to client devices separately or together in map tiles, for example. In other embodiments, the map data and navigation directions may be generated remotely on remote servers separate from the map data server 20 and navigation server 22. Moreover, in some embodiments, the map and navigation directions may be generated by a combination of the map data server 20, the navigation server 22, and any number of additional servers.

In an example implementation, the portable device 12 includes a memory 40, one or more processor(s) (CPU) 50, a graphic processing unit (GPU) 52, a network interface unit 54, and an I/O module 56. The portable device 12 also includes a user interface (UI) 58 for displaying map data and directions, and a global positioning system (GPS) 60 or another suitable positioning module. In some embodiments, the portable device may transmit the offline navigation directions and/or the online navigation directions to a user interface on another device for display such as on a head unit of a vehicle (not shown).

The memory 40 may be tangible, non-transitory memory and may include any types of suitable memory modules, including random access memory (RAM), read only memory (ROM), flash memory, other types of persistent memory, etc. The memory 40 stores an operating system (OS) 42 and one or more applications or modules including a mapping application 14 and a digital navigation module 44. The operating system 42 may be any type of suitable operating system such as modern smartphone operating systems, for example. The I/O module 56 may be a touch-screen, for example. More generally, these techniques can be implemented in other types of devices, such as laptop or desktop computers, car navigation units, etc.

The mapping application 14 generates a digital map using vector graphic data, raster tiles, or map data in any other suitable format for display on a screen. In some cases, the digital navigation module 44 generates offline navigation directions and displays these directions on the digital map. In some scenarios, the navigation module 44 also merges online navigation directions received from the navigation server 22 with the offline navigation directions resulting in an update without re-routing the user. In other scenarios, the navigation module 44 provides the online navigation directions as an alternative to the offline navigation directions.

As an example, a set of navigation directions can include step-by-step instructions for travelling from a first location to a second location. Each instruction can describe a maneuver (e.g., turn left, continue going straight, etc.), the time for presenting a description of the maneuver (e.g., 500 feet prior to reaching the point of maneuver), any other suitable navigation information, or any combination thereof. In some cases, navigation directions describe maneuvers for a bicyclist, a pedestrian, a motorist, etc. When requesting navigation directions, the user can specify whether she is driving, bicycling, or walking. It will also be understood that maps may be updated using the techniques described herein for purposes other than transportation navigation, for example, package routing, map browsing, travel planning, point of interest exploration, any other suitable purpose, or any combination thereof. Moreover, the system described herein is not limited to comparing step-by-step instructions for integrating online with offline data and techniques described herein can be used for any suitable map browsing purpose. For example, maps may be updated using the techniques described herein when a user views traffic in a particular geographic area.

Depending on the implementation, the mapping application 14 is a separate executable made up of compiled instructions that execute directly on the operating system 42, instructions in a scripting language (or another suitable format) that are interpreted at run time by another application such as a web browser, a plugin that extends the functionality of another software application, etc. In one example implementation, the mapping application 14 is an "app" downloaded onto the portable computing device 12 from a web server. In another implementation, the mapping application 14 is a web browser.

In operation, the digital navigation module 44 requests navigation directions and, depending on the scenario, supplemental data including traffic information from the navigation server 22. When portable device 12 cannot connect to a network 18, the network connectivity is limited, the network connection is of poor quality, or the navigation server is otherwise unavailable due to the type of wireless subscription, the distance from a wireless access point etc., the digital navigation module 44 generates the navigation directions locally using offline road data 62.

The offline road data 62 can be stored in a cache implemented in the memory 40. Depending on the implementation, the offline road data 62 can describe such parameters as road geometry (e.g., lengths of road segments), locations of intersections and allowed maneuvers at the intersections (e.g., left and right turns available from road A onto B, only right turn available from road B onto A), road type information (e.g., interstate highway, local road, local street), allowed directions of travel (e.g., one-way, two-way), speed limit data, etc. Moreover, the offline road data 62 in some implementations can include lane-specific information (e.g., number of lanes, carpool lane indications and other lane-specific restrictions). The offline road data 62 can be generally similar to the road data which the navigation server 22 utilized to generate navigation directions. In at least some of the implementations, the portable device 62 does not store all the road data available to the navigation server 22. The portable device 12 may store offline road data for such places as, for example, the area near the user's home, the area near the user's office, areas along the route from the user's home to her office, areas around popular locations, areas surrounding the locations frequently visited by the user, etc. In some scenarios, the mapping application 14 may decide to cache offline road data for the entire town or city where the user lives. In some embodiments, in order for the user to take advantage of these techniques and the benefits thereof, the user may need to select a setting and/or install an application. Generally speaking, the mapping application 14 can select the geographic coverage and the level of detail for offline map data 62 in view of such factors as availability of memory, estimated probability of certain directions being requested by the user, estimated probability of the computing device 12 losing network coverage, etc. Further, the user in some implementations of the mapping application 14 may manually select geographic areas for which the mapping application 14 should cache road data.

Figure 2A:
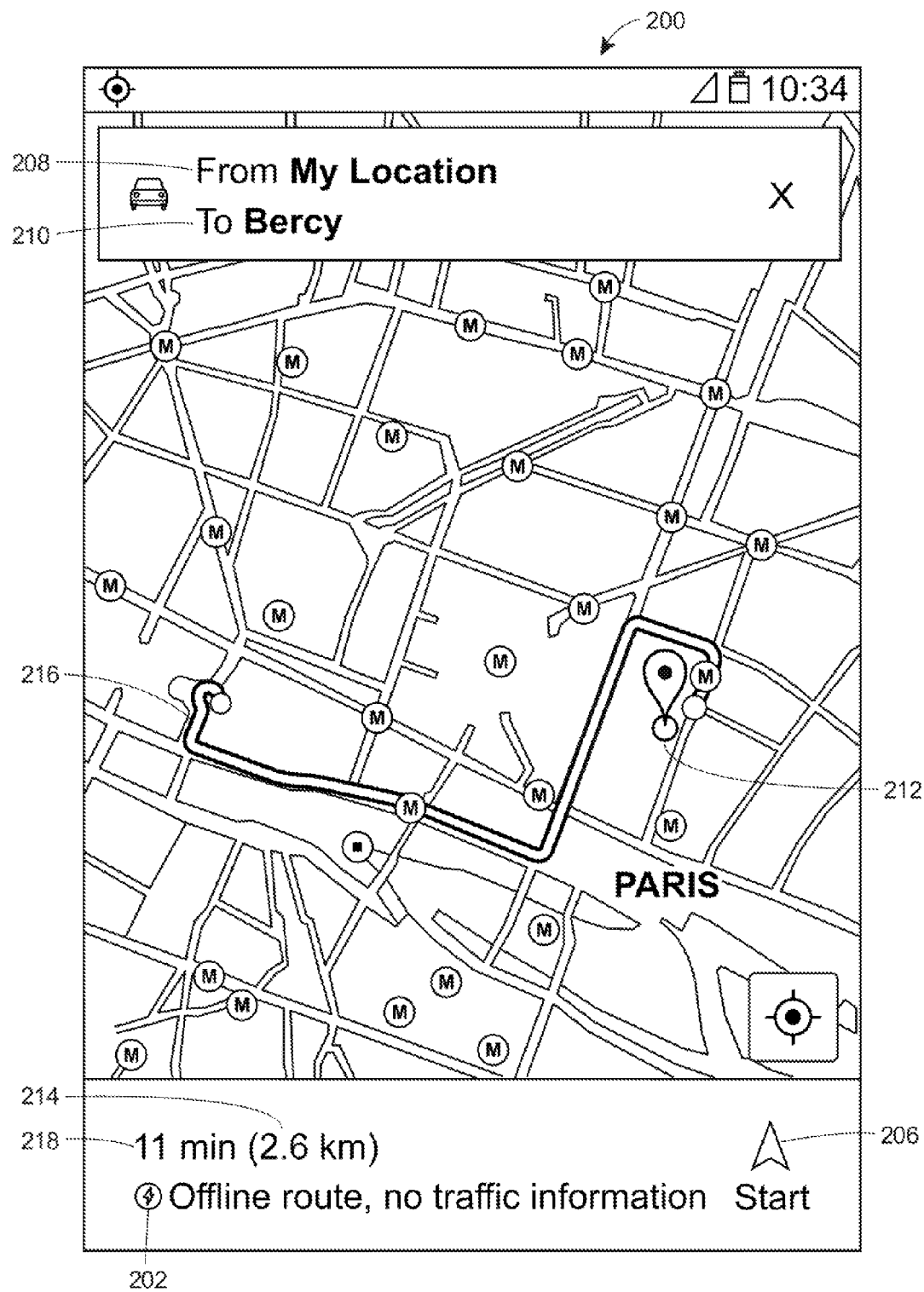
FIG. 2A illustrates an example user interface which displays offline navigation directions.

FIG. 2A illustrates an example user interface 200 which displays the offline navigation directions. The user interface may be the user interface 58 of FIG. 1, and includes a map displaying the offline navigation directions 216 from a first location to a second location. The offline navigation directions 216 are denoted in this example by a darkened line which illustrates a path from the first location to the second location. The user interface 200 also can include an offline indicator 202 indicating to the user that the directions were generated offline and, as a result, traffic information or other map data is unavailable or outdated. In general, the offline indicator 202 may be a shape, a color, a number, text, or any other suitable representation which can be used to indicate to a user that the directions were generated locally.

The navigation directions 216 may guide the user from a first location to a second location such as from "My Location" 208 to "Bercy" 210, where the second location is denoted by an indicator 212. Moreover, the offline navigation directions from the first location to the second location may be based on the offline road data 62 stored in the cache on the portable device 12. For example, there may be offline road data 62 stored in the cache which can be used to generate the path 216 from "My Location" 208 to "Bercy" 210. The user interface 200 also includes an indication of the distance 214 from the first location to the second location (2.6 kilometers) and an estimate of the length of time 218 it will take the user to complete the path (11 minutes). However, because traffic information is unavailable, the time estimate 218 may be inaccurate or outdated based on the traffic conditions from when the navigation directions were originally retrieved from the navigation server 22. In other embodiments, the estimated length of time 218 may be estimated based on the distance from the first location to the second location. A "Start" button 206 is also included on the user interface 200. When the user selects this option, the portable device 12 may provide turn-by-turn directions which follow the path 216 of the offline navigation directions. The turn-by-turn directions may be audio directions or may be displayed as text on the user interface 200 or another user interface.

In some scenarios, while the user follows the turn-by-turn directions and/or after the offline navigation directions are generated, the portable device 12 may be able to connect to a network 18. In this case, the portable device 12 may request and retrieve one or more sets of online navigation directions from the first location to the second location from the navigation server 22. After being retrieved, the sets of online navigation directions do not merely replace the offline navigation directions, because this could be confusing and/or disruptive to the user. The sets of online navigation directions may be integrated with the offline navigation directions to create a smooth transition when the portable device 12 connects to a network.

In order to merge the sets of online navigation directions with the offline navigation directions, the digital navigation module 44 of FIG. 1 compares each set of online navigation directions to the offline navigation directions. If a quantitative metric of the difference between a set of online navigation directions and offline navigation directions is at or above a predetermined threshold/target value/range, etc., then the set of online navigation directions are provided on the same user interface as the offline navigation directions as an alternative route. On the other hand, if the metric is below the predetermined threshold/target value/range, etc., the digital navigation module 44 merges the set of online navigation directions with the offline navigation directions by updating the user interface with current traffic information, time estimates, road closure data, etc. For example, a threshold may be set as 50 percent of waypoints which differ. If the set of online navigation directions and the offline navigation directions have less than 50 percent of their respective waypoints which differ, then the set of online navigation directions merge with the offline navigation directions. On the other hand, if more than 50 percent of their respective waypoints differ, then the set of online navigation directions are provided as an alternative route on the same user interface as the offline navigation directions.

Traffic information may be provided for roads or waypoints (e.g., a set of coordinates which identify a physical space) which are included in both the online and offline navigation directions. Moreover, a time estimate may be provided based on the set of online navigation directions. In some instances, the time estimate may be more accurate than the time estimate for the offline navigation directions because of the more recent traffic data from the navigation server 22. The comparison may be repeated for several sets of online navigation directions such that some sets of online navigation directions are provided on the user interface as alternative routes and other sets of online navigation directions are merged with the offline navigation directions to update the user interface with additional information from the navigation server 22.

To perform the comparison between a set of online navigation directions and the offline navigation directions, the digital navigation module 44 may calculate the difference in the number of waypoints between the online and offline navigation directions. For example, the digital navigation module 44 may determine the offline navigation directions have 9 waypoints in common with the set of online navigation directions and 2 waypoints which differ. In some embodiments, if the user begins navigating by following the turn-by-turn directions, waypoints which have been passed may be discarded whereas waypoints which are coming up shortly may be weighted more heavily. For example, if the offline navigation directions have 5 waypoints in common with the set of online navigation directions and 5 waypoints which differ, but the user has passed 2 of the waypoints which differ and 2 of the waypoints in common are very close to the user than the digital navigation module 44 may determine the metric of the difference between the online and offline navigation directions is small.

In addition to comparing waypoints, the digital navigation module 44 may also calculate a metric of the difference in the estimated time for completing the offline navigation directions compared to the set of online navigation directions. For example, if the estimated time is significantly shorter for the set of online navigation directions, the digital navigation module 44 may determine this is a faster route and provide the set of online navigation directions separately as an alternative to the offline navigation directions. On the other hand, if the estimated time is similar for both versions of directions, the digital navigation module 44 may merge the set of online navigation directions with the offline navigation directions. In some embodiments, the differences may be combined and/or aggregated to determine a quantitative metric of the overall difference between the versions of directions. The metric may then be compared to the predetermined threshold to determine whether to merge the set of online navigation directions with the offline navigation directions or to provide the set of online navigation directions as an alternative route.

Figure 2B:
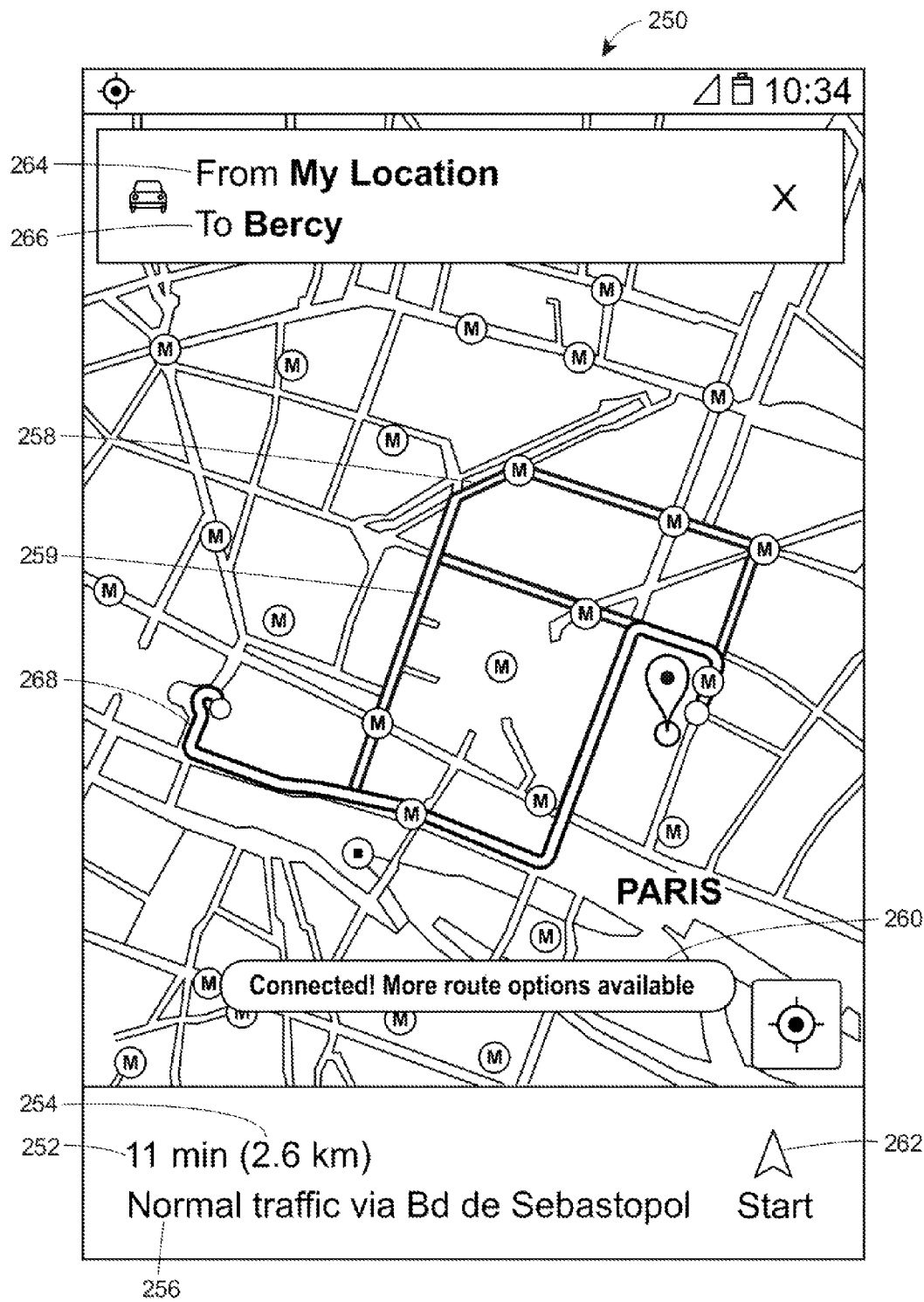
FIG. 2B illustrates an example user interface which displays online navigation directions merged with the offline navigation directions of FIG. 2A.

FIG. 2B illustrates an example user interface 250 which displays online navigation directions merged with the offline navigation directions. Similar to FIG. 2A, the offline navigation directions guide a user on the path 268 (which may correspond to the path 216 in FIG. 2A) from "My Location" 264 to "Bercy" 266, and the distance indicator 254 shows the distance of 2.6 kilometers. After the portable device 12 connects to the network 18, the offline indicator 202 of FIG. 2A no longer appears on the user interface 250. A message 260 (in this case, "Connected! More route options available") may appear on the user interface 250. In other embodiments, different messages may appear to indicate the presence of online navigation directions or a message may not be included. When a set of online navigation directions merges with the offline navigation directions, traffic data 256 may appear on the user interface 250. In the example user interface 250, the traffic data 256 indicates "Normal traffic via Bd de Sébastopol," and as a result, the route may take the user 11 minutes (reference 252) to travel 2.6 kilometers. The traffic data 256 and time estimate data 252 may be retrieved by the digital navigation module 44, from a set of online navigation directions which differs less than a predetermined threshold amount from the offline navigation directions. The time estimate data 252 of FIG. 2B estimates the same length of time as the time estimate data 218 of FIG. 2A. In some instances the time estimate changes after online navigation directions merge with the offline navigation directions based on more recent traffic information. For example, the time estimate may increase if there is heavy traffic on the path 268, and may decrease if there is particularly light traffic.

In addition to the path 268 which displays the offline navigation directions, alternative paths 258, 259 are displayed on the user interface 250. The alternative paths 258, 259 include portions of the route from the first location to the second location. The rest of the routes may be the same as the path 268 for the offline navigation directions. The alternative paths 258, 259 may be retrieved from sets of online navigation directions which differ, for example, more than a predetermined threshold amount from the offline navigation directions. Moreover, the alternative paths 258, 259 may include faster routes than the offline navigation directions. For example, the navigation server 22 may determine using the traffic data that the alternative route 258 takes 9 minutes while the path 268 of the offline navigation directions takes 11 minutes. For example, the roads for the alternative route 258 may be less congested saving the user time. Additionally, the user interface 250 includes the "Start" button 262. The user may start the navigation for the path 268, the alternative paths 258, 259 or any other alternative route retrieved from the navigation server 22. For example, the user may select a path by tapping or clicking on the traffic data 256, time estimate data 252 and/or distance data 214 corresponding to the path. To select an alternative path, the user may perform, for example, a "swipe" gesture at the bottom of the screen, causing the portable device 12 to display traffic data, time estimate data, and/or distance data for one of the alternative paths 258, 259. While the user interface 250 includes only two alternative paths 258, 259, any number of alternative paths may be displayed.

Figure 2C:
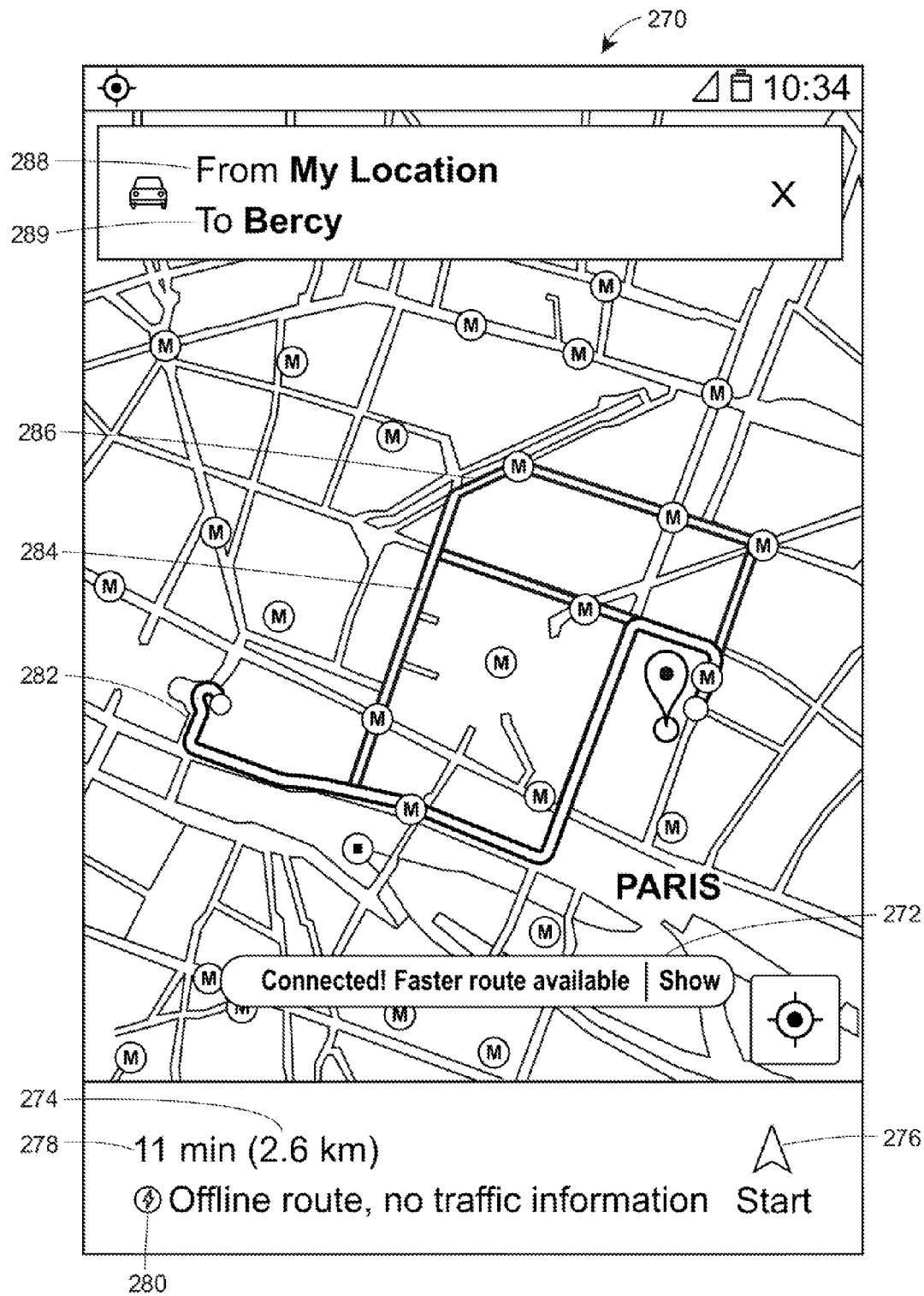
FIG. 2C illustrates an example user interface which displays online navigation directions as alternative routes to the offline navigation directions of FIG. 2A.

FIG. 2C illustrates yet another user interface 270 which displays online navigation directions as alternative routes to the offline navigation directions. Similar to FIG. 2A, the offline navigation directions guide the user on the path 282 (which may correspond to the path 216 in FIG. 2A) from "My Location" 288 to "Bercy" 289, the distance indicator 274 shows the distance of 2.6 kilometers, and a time estimate 278 of 11 minutes. Moreover, the user interface 270 includes the offline indicator 280 (similar to the offline indicator 202 of FIG. 2A) indicating that the directions were generated offline and, as a result, traffic information is unavailable. The user interface 270 also includes the alternative paths 284, 286 (which may correspond to the alternative paths 258, 259 of FIG. 2B) received as online navigation directions from the navigation server 22. While online navigation directions were received at the portable device 12, none of the sets of online navigation directions merged with the offline navigation directions to provide traffic data and time estimate data for the offline route. In this instance, the portable device 12 does not receive a set of online navigation directions that differs from the offline navigation directions less than a predetermined threshold amount. Instead, a message 272 (in this case, "Connected! Faster route available") may appear on the user interface 270. The message 272 also may include a "Show" button, which when selected by the user, may provide a detailed view of an alternative route (e.g., step-by-step navigation instructions). Additionally, the user may perform a "swipe" gesture at the bottom of the user interface to receive traffic data and time estimate data for one of the alternative paths 284, 286, and may begin navigation for the selected path by tapping or clicking on the "Start" button 276.

Figure 2D:
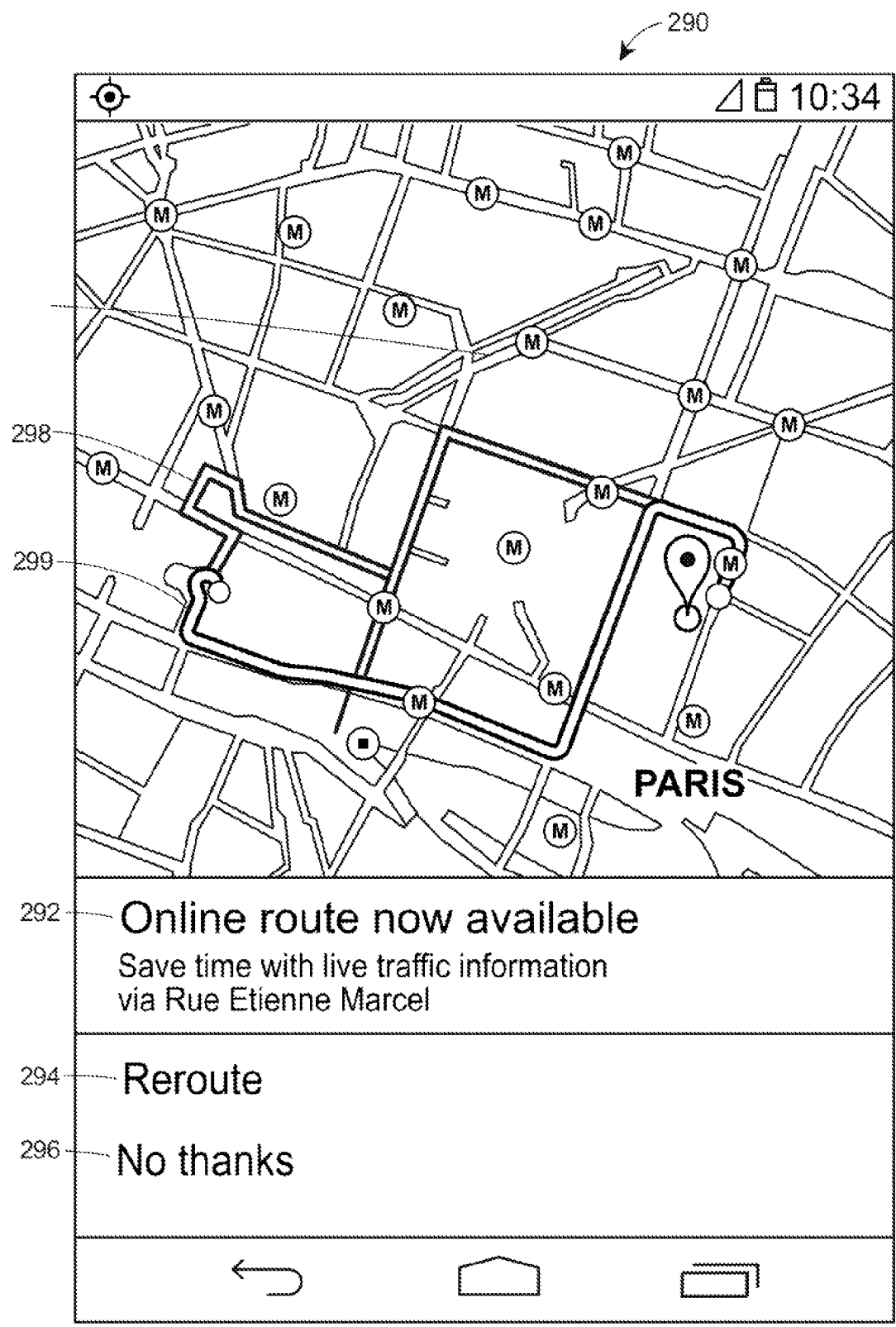
FIG. 2D illustrates an example user interface which displays online navigation directions after the user begins navigating.

FIG. 2D illustrates a user interface 290 which displays online navigation directions after the user begins navigating. In this case, the user selects the offline path 299 for navigation, but the user interface 290 indicates that an online route is currently available by displaying the message 292 ("Online route now available"). The user interface 290 also includes the options "Reroute" 294 and "No thanks" 296. The user may tap or click on the "Reroute" option 294 to receive directions using an online route such as the path 298. Alternatively, the user may tap or click on the "No thanks" option 296 to continue to receive directions along the offline path 216.

Figure 3A:
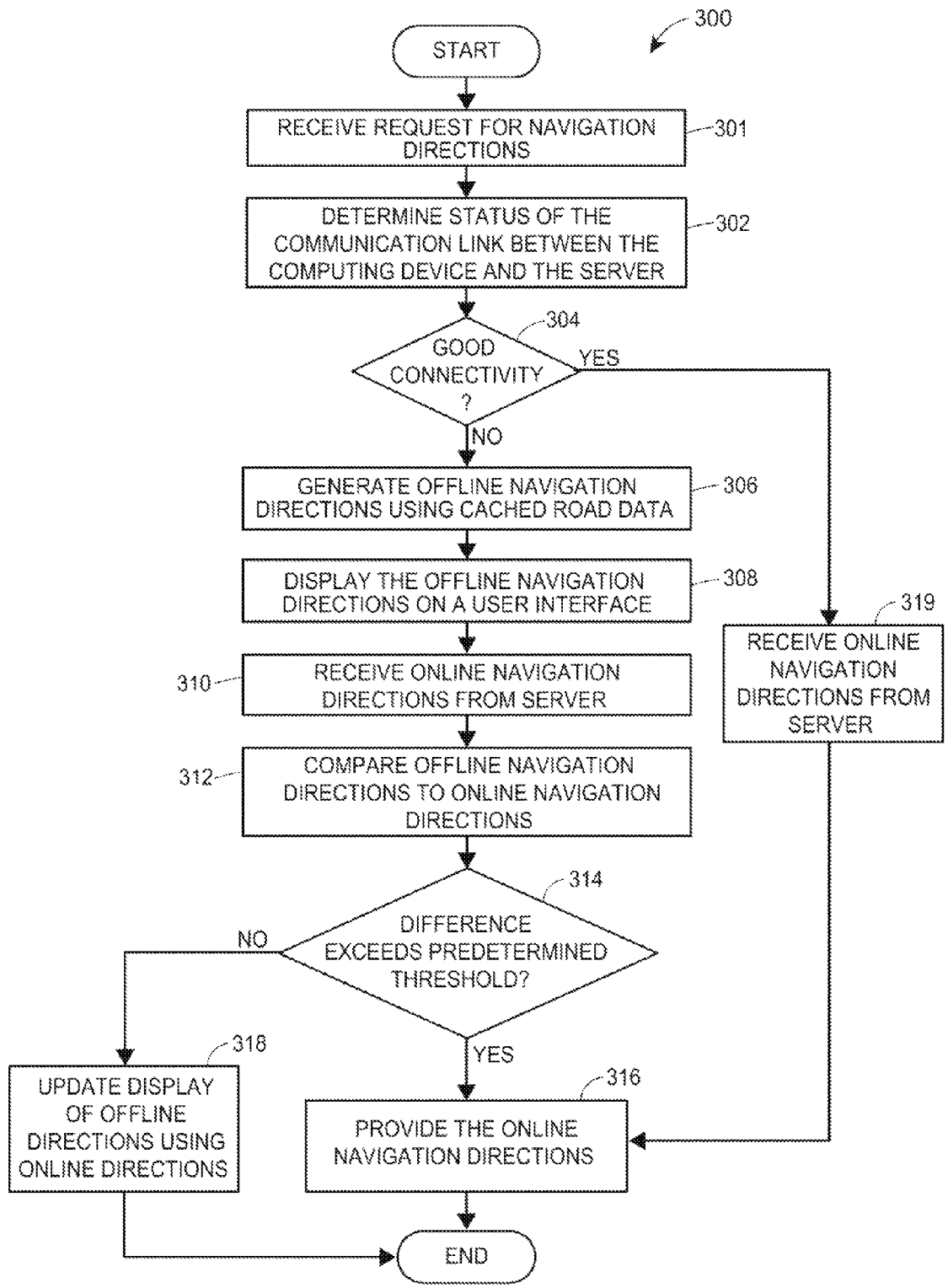
FIG. 3A is a flow diagram of an example method for merging online with offline navigation directions at a client computing device.

FIG. 3A illustrates a flow diagram of an example method 300 for merging online with offline navigation directions on the portable device 12 of FIG. 1. At block 301, the portable device 12 receives a request for navigation directions from a user. For example, the user may request directions from a first location to a second location, such as from the user's current location to Wrigley Field. The portable device 12 then determines the status of the communication link between the portable device 12 and the navigation server (block 302). For example, the portable device 12 may attempt to connect to the Internet via a communication network such as a WiFi network, wireless local area network (WLAN), wide area network (WAN), a local area network (LAN), 3G, 4G, etc.

If the portable device 12 connects to a network with a sufficiently good connection (block 304) then online navigation directions from the first location to the second location are retrieved from the navigation server 22 (block 319) and provided to the user (block 316) via the user interface 58 on the portable device 12. On the other hand, if the quality of service (QoS) of the communication link is below a predetermined threshold/target value/range, etc. which may be selected from several stored thresholds/target values/ranges, the portable device 12 is in airplane mode, the user chooses to receive offline navigation directions, the portable device 12 automatically chooses to receive offline navigation directions based on some combination of factors such as trends, changes, or averages in the QoS of the communication link, processor availability, etc., or there are no available networks to which the portable device 12 can connect, then the portable device 12 may generate offline navigation directions from the first location to the second location (block 306). The offline navigation directions may be generated using a cache in the portable device 12. For example, the portable device 12 may store offline road data for such places as, for example, the area near the user's home, the area near the user's office, areas along the route from the user's home to her office, areas around popular locations, areas surrounding the locations frequently visited by the user, etc. The offline navigation directions are then displayed on the user interface 58 on the portable device 12 (block 308).

After the offline navigation directions are displayed, the portable device 12 may be able to connect to the network 18, and/or the quality of the communication link between the portable device 12 and the navigation server 22 may improve. In this case, the portable device 12 may request and receive a set of online navigation directions from the navigation server 22 (block 310). The set of online navigation directions may be compared to the offline navigation directions to determine a metric of the difference between the versions (block 312), described in further detail below with reference to FIG. 3B. For example, the portable device 12 may determine the number of waypoints which differ between the set of online navigation directions and the offline navigation directions. If the metric of the difference is at or above a predetermined threshold amount (block 314), the set of online navigation directions is provided to the user as an alternative route to the offline navigation directions (block 316). Otherwise, if the difference metric is below the threshold amount, the user interface on the portable device 12 may be updated with traffic data and/or time estimate data from the set of online navigation directions (block 318).

In some embodiments, the portable device 12 may receive several sets of online navigation directions, and in this case the difference between each set of online navigation directions is compared to the offline navigation directions. For each set, if the online navigation directions differs more than a predetermined amount from the offline navigation directions, then both versions are provided on the user interface, and the online navigation directions are provided as an alternative route. Otherwise, only the offline navigation directions are provided on the user interface, but the offline navigation directions are updated to include traffic data and/or time estimate data from the online navigation directions.

Figure 3B:
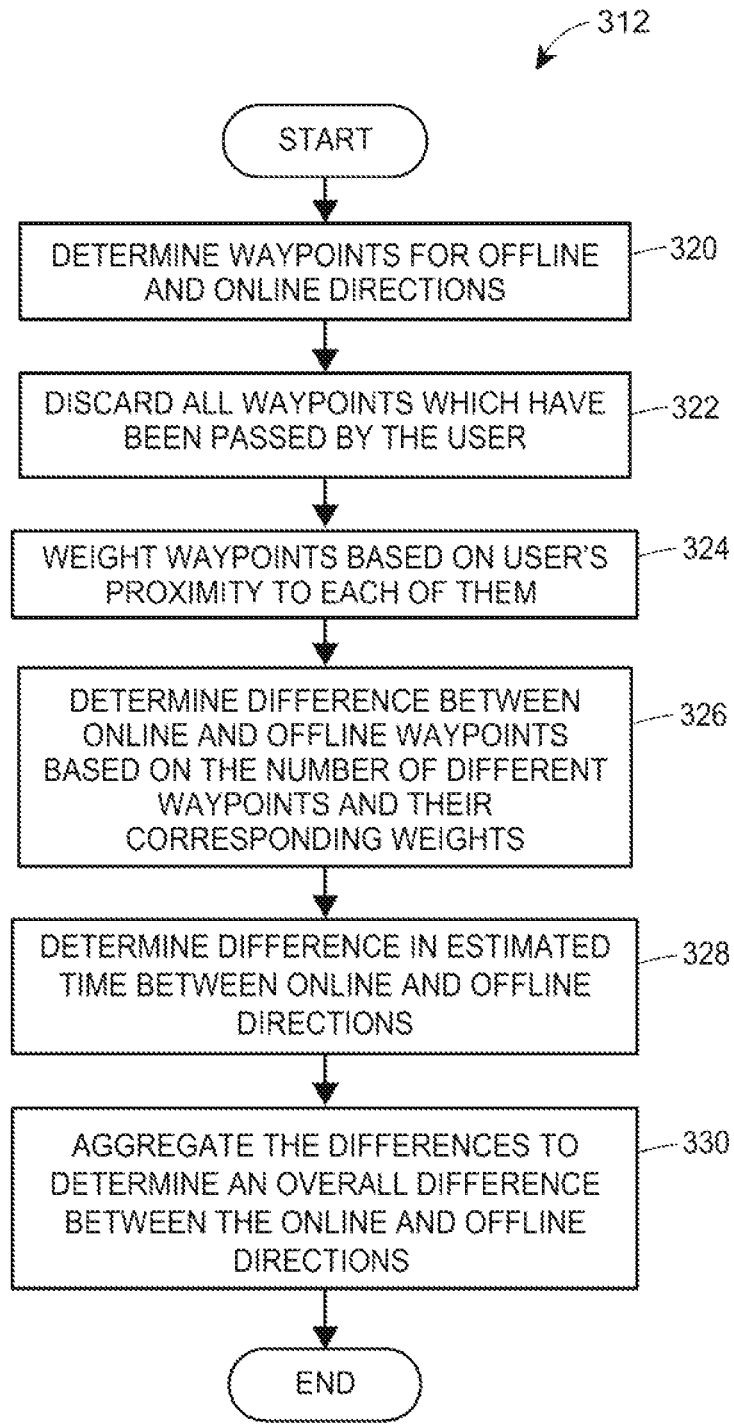
FIG. 3B is a flow diagram of an example method for comparing online to offline navigation directions as in the method of FIG. 3A.

FIG. 3B illustrates an example method that can be executed at block 312 of the method 300. However, the flow diagram 312 merely illustrates one exemplary method for comparing a set of online navigation directions to offline navigation directions to generate a metric of the difference. The online and offline navigation directions may be compared in any number of ways and in any suitable manner.

At block 320 the portable device 12 determines waypoints for both the online and the offline navigation directions. If the user has already begun navigation to the second location, the portable device 12 discards all waypoints which have been passed by the user (block 322). In some implementations, if the user has not started on the route, none of the waypoints are discarded. Then, each waypoint is assigned a weight based on its proximity to the user (block 324). For example, all waypoints within a mile of the user may be assigned a weight of 2 whereas waypoints between one and five miles from the user may be assigned a weight of 1. Moreover, waypoints more than five miles from the user may be assigned a weight of 0.5. However, this is merely an example and any number of weights can be assigned for any number of distances from the user.

After assigning a weight to each waypoint, the portable device 12 determines a metric of the difference between the online and offline waypoints based on the number of different waypoints and their respective weights (block 326). For example, if the offline navigation directions have 10 waypoints which differ from the online navigation directions, but the waypoints are each very far away and are assigned a weight of 0.1, then the difference metric may be 1. On the other hand, if the offline navigation directions only have 1 waypoint which differs from the online navigation directions, but the waypoint is extremely close by and is assigned a weight of 2, then the difference metric may be 2.

In addition to calculating a metric of the difference between the online and offline navigation directions based on waypoints, the portable device 12 may determine a metric of the difference in estimated time between the online and offline navigation directions (block 328). For example, the offline navigation directions may be estimated to take an hour whereas the online navigation directions may be estimated to take 45 minutes. Therefore, the metric of the difference in estimated time may be determined to be 15 minutes, or in another embodiment the metric of the difference may be calculated as 75 percent of the time it takes to complete the offline navigation directions.

The metric of the difference in number of waypoints and their respective weights may be aggregated and/or combined with the metric of the difference in estimated time to determine an overall metric of the difference between the online and offline navigation directions (block 330). For example, the overall metric of the difference may be calculated by adding the differences in waypoints and estimated time. Moreover, the overall metric of the difference may also be calculated by combining the differences in waypoints and estimated time in any other suitable manner.

It will be understood that the steps of the flow diagrams in FIGS. 3A and 3B are merely exemplary. In some implementations, the steps of the flow diagrams may be reordered, repeated, removed, supplemented, otherwise altered, or any combination thereof as needed.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for integrating online with offline navigation directions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable memory coupled to one or more processors in a computing device and storing thereon (i) offline map data and (ii) instructions that implement a navigation module that executes on the one or more processors to:
   determine a current status of a communication network,
   in response to determining that the computing device is unable to connect to the communication network or a connectivity metric for the communication network is below a threshold based on the current status of the communication network, generate offline navigation directions from a first location to a second location using the offline map data,
   display an offline route based on the offline navigation directions via a user interface,
   subsequent to generating the offline navigation directions while the computing device travels along the offline route and in response to connecting to the communication network, receive online navigation directions from a navigation server via the communication network,
   determine a difference metric between the offline navigation directions and the online navigation directions;
   update the display of the offline route based at least in part on the online navigation directions when the difference metric between the offline navigation directions and the online navigation directions is below a certain threshold, and
   provide the online navigation directions via the user interface as an alternative to the offline navigation directions when the difference metric is not below the certain threshold, wherein the online navigation directions are displayed as an additional route on the user interface along with the offline route.

2. The computer-readable memory of claim 1, wherein to determine the difference metric between the offline navigation directions and the online navigation directions, the navigation module executes on the one or more processors to:
   compare one or more offline waypoints in the offline navigation directions to one or more online waypoints in the online navigation directions, and
   calculate the difference metric between the offline navigation directions and the online navigation directions based on the comparison.

3. The computer-readable memory of claim 2, wherein to calculate the difference metric between the offline navigation directions and the online navigation directions, the navigation module executes on the one or more processors to:
   assign a weight to each of the offline waypoints and the online waypoints based on a distance from a computing device which includes the computer-readable memory to the respective offline or online waypoint, and
   calculate a weighted difference metric between the offline navigation directions and the online navigation directions.

4. The computer-readable memory of claim 2, wherein to determine the difference metric between the offline navigation directions and the online navigation directions, the navigation module further executes on the one or more processors to:
   compare an estimated time for completing the offline navigation directions to an estimated time for completing the online navigation directions.

5. The computer-readable memory of claim 2, wherein to compare one or more offline waypoints in the offline navigation directions to one or more online waypoints in the online navigation directions, the navigation module further executes on the one or more processors to:
   discard each offline and online waypoint in the offline and online navigation directions that have been passed by the computing device, and
   compare offline waypoints in the offline navigation directions which have not been passed by the computing device to online waypoints in the online navigation directions which have not been passed by the computing device.

6. The computer-readable memory of claim 1, wherein the current status of the communication network is determined based on at least one of: (i) a quality of service (QoS) of the communication network, or (ii) a type of wireless subscription.

7. The computer-readable memory of claim 1, wherein the navigation module further executes on the one or more processors to:
   display an offline indicator via the user interface, wherein the offline indicator signifies to a user that the navigation directions were generated offline.

8. The computer-readable memory of claim of 1, wherein to determine a difference metric between the offline navigation directions and the online navigation directions, the navigation module executes on the one or more processors to:
   receive a plurality of sets of online navigation directions from the navigation server, wherein each set of online navigation directions guides a user to the same second location via a different path, and determine a difference metric between the offline navigation directions and each set of online navigation directions.

9. The computer-readable memory of claim 1, wherein to update the display of the offline route using the online navigation directions, the navigation module executes on the one or more processors to:
update the display of the offline route with at least one of: (i) estimated time data, or (ii) traffic data via the user interface using the online navigation directions.

10. A method for integrating online navigation directions with offline navigation directions, the method comprising:
determining, by one or more processors in a computing device, a current status of a communication network;
in response to determining that the computing device is unable to connect to the communication network or a connectivity metric for the communication network is below a threshold based on the current status of the communication network, generating, by the one or more processors, offline navigation directions from a first location to a second location using offline map data;
displaying, by the one or more processors, an offline route based on the offline navigation directions via a user interface;
subsequent to generating the offline navigation directions while the computing device travels along the offline route and in response to connecting to the communication network, receiving, at the one or more processors, online navigation directions from a navigation server via the communication network;
determining, by the one or more processors, a difference metric between offline navigation directions and the online navigation directions;
updating, by the one or more processors, the display of the offline route based at least in part on the online navigation directions when the difference metric between the offline navigation directions and the online navigation directions is below a certain threshold; and
providing, by the one or more processors, the online navigation directions via the user interface as an alternative to the offline navigation directions when the difference metric is not below the certain threshold, wherein the online navigation directions are depicted as an additional route on the user interface along with the offline route.

11. The method of claim 10, wherein determining the difference metric between the offline navigation directions and the online navigation directions comprises:
comparing, by the one or more processors, one or more offline waypoints in the offline navigation directions to one or more online waypoints in the online navigation directions; and
calculating, by the one or more processors, the difference metric between the offline navigation directions and the online navigation directions based on the comparison.

12. The method of claim 11, wherein calculating the difference metric between the offline navigation directions and the online navigation directions comprises:
assigning, by the one or more processors, a weight to each of the offline waypoints and the online waypoints based on a distance from the computing device to the respective offline or online waypoint; and
calculating, at the one or more processors, a weighted difference metric between the offline navigation directions and the online navigation directions.

13. The method of claim 11, wherein determining the difference metric between the offline navigation directions and the online navigation directions further comprises:
comparing, by the one or more processors, an estimated time for completing the offline navigation directions to an estimated time for completing the online navigation directions.

14. The method of claim 11, wherein comparing one or more offline waypoints in the offline navigation directions to one or more online waypoints in the online navigation directions comprises:
discarding, by the one or more processors, each offline and online waypoint in the offline and online navigation directions that have been passed by the computing device; and
comparing, by the one or more processors, offline waypoints in the offline navigation directions which have not been passed by the computing device to online waypoints in the online navigation directions which have not been passed by the computing device.

15. The method of claim 10, wherein the current status of the communication network is determined based on at least one of: (i) a quality of service (QoS) of the communication network or (ii) a type of wireless subscription.

16. The method of claim 10, further comprising:
displaying, by the one or more processors, an offline indicator via the user interface, wherein the offline indicator signifies to a user that the navigation directions were generated offline.

17. The method of claim of 10, wherein determining a difference metric between the offline navigation directions and the online navigation directions comprises:
receiving, at the one or more processors, a plurality of sets of online navigation directions from the navigation server, wherein each set of online navigation directions guides a user to the same second location via a different path; and
determining, by the one or more processors, a difference metric between the offline navigation directions and each set of online navigation directions.

18. The method of claim 10, wherein updating the display of the offline route using the online navigation directions comprises:
updating, by the one or more processors, the display of the offline route with at least one of: (i) estimated time data, or (ii) traffic data via the user interface using the online navigation directions.

* * * * *